(No Model.)
C. C. HARRIS.
DEVICE FOR STOPPING HORSES.
No. 352,241. Patented Nov. 9, 1886.
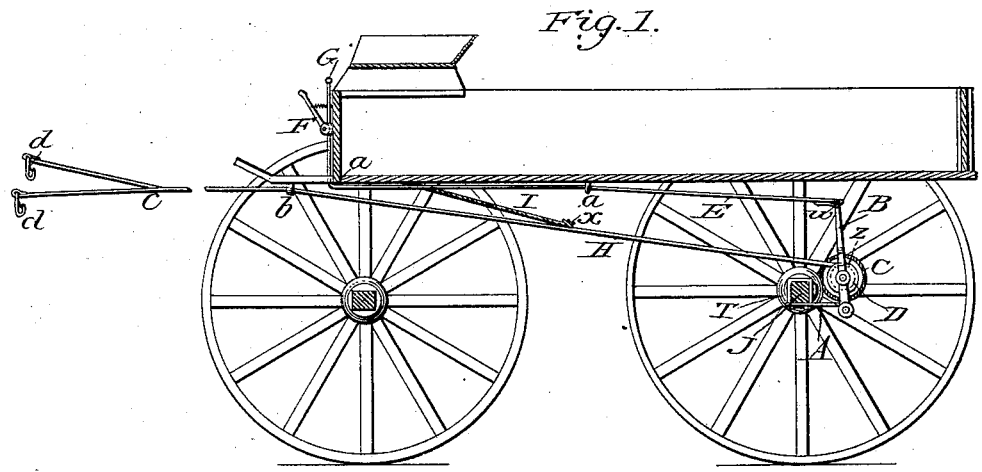
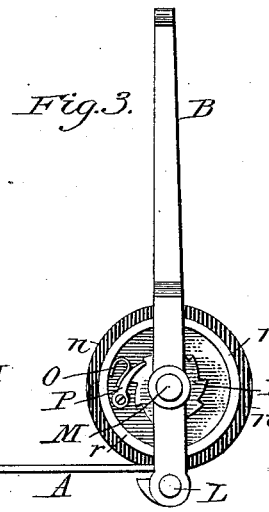
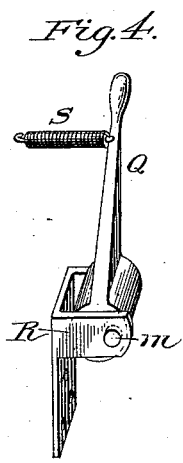
Witnesses:
John Gibson
Jerome De Harpart
Inventor:
Carleton Charles Harris

UNITED STATES PATENT OFFICE.

CARLETON CHARLES HARRIS, OF DENVER, COLORADO.

DEVICE FOR STOPPING HORSES.

SPECIFICATION forming part of Letters Patent No. 352,241, dated November 9, 1886.

Application filed July 9, 1886. Serial No. 207,629. (No model.)

*To all whom it may concern:*

Be it known that I, CARLETON CHARLES HARRIS, a citizen of the United States, residing at Denver, in the county of Arapahoe and State of Colorado, have invented a new and useful Appliance for Holding Horses when Attached to a Vehicle and to Prevent them from Running Away, of which the following is a specification.

My invention relates to improvements in appliances for holding horses, in which a friction-wheel operates in conjunction with the hub of a vehicle-wheel, which operates a drum, to which is attached a strap or line leading from the drum to the bit or bridle of the horse or horses; and the object of my invention is to place an appliance on a vehicle that will bring a horse or horses under perfect control. I attain this object by the mechanism illustrated in the accompanying drawings, in which—

Figure 1 is a vertical section of the appliance attached to the vehicle; Fig. 2, a rear view of a part of the appliance; Fig. 3, a side elevation of a part of the appliance, and Fig. 4 a detailed view in perspective of the self-acting clasp for lever-strap.

Similar letters refer to similar parts throughout the several views.

The plate A, to which is pivoted lever B, is secured to the rear axle, J, close to the hub T, by clip-bolts. The lever B is formed with an aperture, in which the drum D (see Fig. 2) revolves in bearings in lever B at $e\,e$. The friction-wheel C revolves loosely on the shaft M, and works up against the ratchet N, which is fastened to the shaft M. The pawl P is pivoted to the inner casing of the friction-wheel C, and is held in contact with ratchet N by the spring O. The friction-wheel C is provided with a band or tire of hard rubber, $n\,n$, which is held in place firmly by the flanges $r\,r$. The lever B works on a shaft, L, which passes through bearings on the plate A. A heavy spiral spring, K, is attached at one end to the shaft L, and at the other end to the plate A, (see Fig. 2,) and is for the purpose of throwing lever B back and holding it when not in use. The self-acting clasp (see Fig. 4) is formed with plate R, eccentric-lever Q, which is pivoted in plate R, and spiral spring S, one end of which is fastened to the lever Q and the other end to the vehicle, and is used for the purpose of holding the eccentric-lever Q against the lever-strap E. The lever-strap E (see Fig. 1) is fastened at one end to the top of the lever B at $w$, and passes along under the body of the vehicle through guide-loops $a$ and $a$, then through the self-acting clasp F, and is supplied with a handle, G. By pulling on the handle G the lever B is drawn forward, which forces the friction-wheel C in contact with the hub T.

The holding strap or line H is fastened at one end to the drum D at $z$, and passes up under the body of the vehicle through a guide-loop, $b$, which is located over the fifth-wheel. The outer end of the strap H is formed with a fork at $c$, and is supplied on the ends with snap-hooks $d\,d$, which are fastened to the bridle-bit of the horse or horses. When the friction-wheel C is drawn in contact with the hub T, a forward movement of the vehicle-wheel will cause the pawl P to drop into the ratchet N, which in turn will revolve the drum D, which winds up the strap H, thus causing the strap H to draw back on the horse or horses to which it is attached. In a reversed motion of a vehicle-wheel the pawl P rotates around the ratchet N, thus leaving the drum free. The strap H is provided with an elastic rubber tension, I, which is fastened at one end to the strap H at $x$ and at the other end to the body of the vehicle, and is placed there for the purpose of drawing or unwinding the strap H off of the drum D when the friction-wheel C is thrown back from the hub T. To throw the friction-wheel from the hub T is accomplished by pressing down on eccentric-lever Q, which loosens lever-strap E, and the spiral spring K, operating as previously described, forces the lever B back, which in turn carries the friction-wheel C clear from the hub T. The elastic rubber tension I immediately draws the strap H off of the drum D, thus leaving the horse or horses free to act.

To throw the appliance in operation, pull upon handle G. The spiral spring S pulls the eccentric-lever against the strap E, which holds it from slipping back, thus holding the friction-wheel C in contact with the hub T.

I am aware that prior to my invention appliances have been made to hold horses while said horses were attached to vehicles. I therefore do not claim such a combination, broadly; but What I do claim as my invention, and desire to secure by Letters Patent, is—

The combination, in an appliance to hold horses and to prevent them from running away, of the plate A, the lever B, the friction-wheel C, the rotary drum D, the spiral spring K, the lever-strap E, the self-acting clasp F, the holding-strap H, and the rubber elastic tension I, all substantially as described, and for the purpose set forth.

CARLETON CHARLES HARRIS.

Witnesses:
JOHN GIBSON,
JEROME DE HARPART.